(12) United States Patent
Banno

(10) Patent No.: US 7,336,575 B2
(45) Date of Patent: Feb. 26, 2008

(54) INFORMATION RECORDING/REPRODUCING APPARATUS THAT IMPROVES RECORDING/REPRODUCING CHARACTERISTICS

(75) Inventor: Masahiko Banno, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 558 days.

(21) Appl. No.: 10/921,500

(22) Filed: Aug. 19, 2004

(65) Prior Publication Data
US 2005/0052975 A1    Mar. 10, 2005

(30) Foreign Application Priority Data

| Aug. 25, 2003 | (JP) | ............................. 2003-299758 |
| Aug. 25, 2003 | (JP) | ............................. 2003-299760 |

(51) Int. Cl.
G11B 7/00 (2006.01)
(52) U.S. Cl. .................. 369/47.53; 369/53.15
(58) Field of Classification Search ............... 369/47.5, 369/47.51, 47.52, 47.53, 47.54, 116, 275.3, 369/53.15
See application file for complete search history.

(56) References Cited

U.S. PATENT DOCUMENTS

| 4,876,606 | A |  | 10/1989 | Banno et al. |
| 4,924,320 | A |  | 5/1990 | Tanaka et al. |
| 5,095,371 | A |  | 3/1992 | Tanaka et al. |
| 5,194,879 | A |  | 3/1993 | Kotabe et al. |
| 6,650,606 | B2 |  | 11/2003 | Banno |
| 6,760,287 | B2 | * | 7/2004 | Sato ........................ 369/47.53 |

FOREIGN PATENT DOCUMENTS

| JP | 7-311942 | 11/1995 |
| JP | 8-339541 | 12/1996 |
| JP | 09 305973 | 11/1997 |
| JP | 11 296858 | 10/1999 |
| JP | 2001-307327 | 11/2001 |
| JP | 2002 170237 | 6/2002 |

* cited by examiner

Primary Examiner—Nabil Hindi
(74) Attorney, Agent, or Firm—Cooper & Dunham LLP

(57) ABSTRACT

An information recording/reproducing apparatus includes a use condition determination part that reproduces a specific area on a rewritable recording medium and determines whether an unused area exists. A recording linear velocity changing part changes a recording linear velocity in a radial direction of the medium. A recording clock cycle changing part changes a recording clock cycle in accordance with a change in the velocity. A test writing part performs test writing with a different recording power for each step. An optimum recording power determination part reproduces test-written information and determines an optimum recording power for a recording linear velocity in test writing based on a characteristic value of a reproduction signal. When the unused area exists, test writing is performed thereon at a recording linear velocity the same as that in recording, the optimum recording power for the area is determined, and information is recorded with the optimum recording power.

20 Claims, 10 Drawing Sheets

FIG.10

| MDT | DTB | STATUS | ENTRY TYPE | FAULTY ADDRESS | ALTERNATIVE ADDRESS |
|---|---|---|---|---|---|
| 0 | 0 | 0 | REAL LOCATION ENTRY | 0 05 A0 | 0 04 00 |
| | | 0 | | 0 05 A1 | 0 04 01 |
| | | | | | |
| | | 0 | | 0 05 BF | 0 04 1F |
| | | 0 | | 0 05 C0 | 0 04 20 |
| | | 2 | FREE ENTRY | 0 00 00 | 0 04 21 |
| | | 2 | | 0 00 00 | 0 04 23 |
| | | 2 | | 0 00 00 | 0 04 24 |
| | | | | | |
| | | 2 | | 0 00 00 | 0 04 FF |
| | | 3 | UNUSABLE ENTRY | | 0 04 22 |
| | | 3 | | | 0 04 28 |

# INFORMATION RECORDING/REPRODUCING APPARATUS THAT IMPROVES RECORDING/REPRODUCING CHARACTERISTICS

BACKGROUND OF THE INVENTION

1. Field of the Invention

The present invention generally relates to an information recording/reproducing apparatus that records information on and/or reproduces information from optical disk recording media allowing rewriting of information.

2. Description of the Related Art

Conventionally, optical disk apparatuses, which are information recording/reproducing apparatuses, generally perform recording while rotating a recording medium at a CLV (Constant Linear Velocity). In the CLV method, the relative rates of a recording medium and a laser beam are always constant. Thus, once optimum recording conditions such as a recording power and a recording pulse width are determined, it is unnecessary to vary the recording conditions over the entire surface of a recording medium. Hence, normally, test writing is performed in a specific area of the innermost track portion while changing the power of a laser beam in stages for each predetermined step. The area on which test writing is performed is reproduced, and the optimum recording power is determined based on the characteristic values of a reproduction signal. Then, recording is generally performed on the entire recording medium at an identical CLV by using the optimum recording power.

In the CLV method, however, since the rotational speed is controlled such that the linear velocity becomes constant, it is necessary to increase the rotational speed for the inner tracks. Thus, it becomes more difficult to control the rotation as the linear velocity becomes larger. That is, since it is necessary to vary the rotational speed, higher rotational torque is required. This causes problems such as an increase in the size and/or cost, and an increase in noise and/or vibration. There is also a problem in that, since a waiting time is required until the speed is changed at the time of seeking, the access time becomes longer.

Therefore, with the increase in the recording speed, there have been proposed methods of recording information on a recording medium while rotating the recording medium at a CAV (Constant Angular Velocity), and the ZCLV method that divides a recording medium into several zones in the radial direction and records information on the recording medium while varying the linear velocity in stages. Among these, the CAV method offers various advantages, for example: since the rotation of a recording medium is controlled by a constant angular velocity (number of revolutions), speed control is easier compared to the CLV method; since a low rotational torque will suffice, it is possible to use a small and low-cost motor; and since waiting time for changing speed is not required, it is possible to reduce the access time.

In the CAV method and the ZCLV method, on the other hand, the number of RPMs in the inner tracks is not originally increased. Accordingly, the recording linear velocity is lower in the inner tracks and higher in the outer tracks. For example, a case is assumed where a recording operation is performed according to a CAV method in which the number of RPMs is constant and the recording linear velocity in the outer tracks is equivalent to 24-speed. In this case, the recording linear velocity in the inner tracks is approximately 10-speed, and the actual recording linear velocity is varied from 10-speed to 24-speed. Accordingly, considering a case of recording information on the entire surface of a recording medium, for the most part, recording must be performed at a linear velocity that is different from the recording linear velocity in the specific inner track area on which test writing is performed.

Generally, in organic dye DVD-R media and phase-change type rewritable (RW) media on which pits (marks) are formed by heat modes, the pulse width of a recording pulse sequence and the recording power of a laser beam at the time of recording are optimized at a specific recording linear velocity. Hence, the states of marks and spaces to be formed vary at different recording linear velocities. That is, there have been problems in that, if the pulse width and/or the recording power are not correctly set, jitter characteristics are degraded for the reasons as follows: the amount of heat required for formation of marks may be excessive or insufficient; the average length of marks may be varied due to the difference between an optimum decomposition temperature and a heating temperature achieved at each mark length; and the mark width is increased/decreased depending on the mark length since a uniform mark width is not achieved due to variation in the optimum pulse width.

In order to solve the above-mentioned problems, there has been proposed an information recording apparatus that varies recording power based on a writing clock frequency that is proportional to recording linear velocity (Japanese Laid-Open Patent Application No. 11-296858).

There has also been proposed an information recording apparatus that: at the time of factory shipment, divides the entire area (including a user area) of a recording medium into several zones and stores in storing means the optimum recording power level for each of the zones obtained by test writing of each of the zones, performs test writing in PCAs (Power Calibration Areas) provided in an inner track portion and an outer track portion before actual recording so as to obtain the rate of change between the optimum recording power levels stored in the storing means and the optimum recording power obtained by test writing in the PCAs, and corrects the optimum recording power levels stored in the storing means by calculation in order to realize optimum recording over the entire area of the recording medium (Japanese Patent No. 3164763).

However, the conventional information recording apparatuses as mentioned above still include problems. The information recording apparatus described in Japanese Laid-Open Patent Application No. 11-296858 has a problem in that recording of good quality cannot be achieved unless recording characteristics (i.e., required recording power and/or other recording conditions) of a recording medium are in exact proportion to recording linear velocity. As a matter of course, there is no such a disk recording medium, and variation in each recording medium is inevitable. Additionally, as represented by the information recording apparatus described in Japanese Patent No. 3164763, in the case where optimum recording power in the entire area of a recording medium is corrected by calculation using a certain coefficient based on results of test writing in PCA, there is a problem in that variation in each recording medium, variation in areas of the recording medium, and variation in the environment (e.g., temperature and humidity) at the time of recording are not considered.

SUMMARY OF THE INVENTION

A general object of the present invention is to provide an improved and useful information recording apparatus in which one or more of the above-mentioned problems are eliminated.

Another and more specific object of the present invention is to provide an information recording apparatus that accurately determines an optimum recording power irrespective of areas on a recording medium, variations in each recording medium, and variations in the environment at the time of recording, thereby significantly improving recording/reproducing characteristics.

In order to achieve the above-mentioned objects, according to one aspect of the present invention, there is provided an information recording/reproducing apparatus that records information on and/or reproduces information from an optical disk recording medium allowing rewriting of information, the information recording/reproducing apparatus including:

a use condition determination part that reproduces a specific area on the recording medium and determines whether the recording medium includes an unused area where no information is recorded;

a recording linear velocity changing part that changes a recording linear velocity in a radial direction of the recording medium;

a recording clock cycle changing part that changes a recording clock cycle in accordance with a change in the recording linear velocity;

a test writing part that performs test writing on the recording medium with a different recording power for each step; and an optimum recording power determination part that reproduces information that is written on the recording medium in the test writing by the test writing part and determines an optimum recording power for a recording linear velocity at the time of the test writing based on a characteristic value of a reproduction signal, wherein, when the use condition determination part determines that the recording medium includes the unused area, the test writing part performs the test writing on the unused area at a recording linear velocity the same as that in recording information, the optimum recording power determination part determines the optimum recording power, and when recording information, the information is recorded with the determined optimum recording power.

According to the above-mentioned aspect of the present invention, when the use condition determination part determines that the recording medium includes an unused area, the test writing part performs test writing in the unused area at the recording linear velocity the same as that in recording information, the optimum recording power determination part determines an optimum recording power for the unused area, and information is recorded with the determined optimum recording power. Hence, it is possible to accurately determine an optimum recording power irrespective of areas on the recording medium, variations in each recording medium, or variations in an environment at each time of recording.

In addition, according to the above-mentioned aspect of the present invention, even when recording is performed according to the CAV method or the ZCLV method, which is adopted in high-speed recording, it is possible to accurately determine an optimum recording power and/or another recording condition irrespective of areas on the recording medium, i.e., recording linear velocities, variations in each recording medium, or variations in an environment at each time of recording. Thus, it is possible to provide an information recording/reproducing apparatus that significantly improves recording/reproducing characteristics.

In another embodiment of the present invention, when the use condition determination part determines that a user area of the recording medium is all unused, a plurality of concentric zones may be formed in the radial direction of the user area of the recording medium, the test writing part may perform the test writing on the zones at a recording linear velocity the same as that in recording information, the optimum recording power determination part may determine an optimum recording power for each of the zones, and when recording information in each of the zones, the information may be recorded with the optimum recording power corresponding to the zone.

Accordingly, it is possible to accurately determine the optimum recording powers for all areas of the recording medium irrespective of the areas on the recording medium, variations in each recording medium, or variations in the environment at each time of recording.

In addition, even if a recording medium on which recording is to be performed includes a recorded portion, it is possible to optimize the recording power with respect to an unused area.

In another embodiment of the present invention, the information recording/reproducing apparatus may further include:

a storing part that stores a previously set optimum recording power for each of the zones; and a correction part that corrects the previously set optimum recording power by predetermined calculation.

Accordingly, it is possible to accurately determine an optimum recording power irrespective of areas on the recording medium, variations in each recording medium, or variations in the environment at each time of recording.

According to another aspect of the present invention, there is provided an information recording/reproducing apparatus that records information on and/or reproduces information from an optical disk recording medium allowing rewriting of information, the information recording/reproducing apparatus including:

a recording linear velocity changing part that changes a recording linear velocity in a radial direction of the recording medium;

a recording clock cycle changing part that changes a recording clock cycle in accordance with a change in the recording linear velocity;

a test writing part that performs test writing on the recording medium with a different recording power for each step; and an optimum recording power determination part that reproduces information that is written on the recording medium in the test writing by the test writing part and determines an optimum recording power for a recording linear velocity at the time of the test writing based on a characteristic value of a reproduction signal, wherein, based on an instruction from an external host computer, the test writing part performs the test writing on a head portion of a user area of the recording medium at a recording linear velocity the same as that in recording information, the optimum recording power determination part determines the optimum recording power, and information is recorded with the determined optimum recording power.

According to the above-mentioned aspect of the present invention, by directly using the user area on which information is to be recorded so as to determine an optimum recording power, it is possible to accurately determine an optimum recording power irrespective of areas on the recording medium, variations in each recording medium, or variations in an environment at each time of recording.

In an embodiment of the present invention, the information recording/reproducing apparatus may further include:

a storing part that stores a previously set optimum recording power for each of concentric zones formed in the user area in the radial direction; and a correction part that corrects the previously set optimum recording power by predetermined calculation.

Accordingly, it is possible to accurately determine an optimum recording power irrespective of areas on the recording medium, variations in each recording medium, or variations in the environment at each time of recording.

Additionally, according to another aspect of the present invention, there is provided an information recording/reproducing apparatus that records data on and/or reproduces data from a recording medium having a program area that includes a plurality of recording sectors to which data are recorded and a plurality of alternative sectors, when one or more of the recording sectors including a defect, the one or more recording sectors being treated as one or more faulty sectors substituting for the one or more recording sectors, the information recording/reproducing apparatus comprising:

a test writing part that performs test writing of data on the recording medium with a different recording power for each step;

an optimum recording power determination part that determines an optimum recording power; and an alternation management table for managing the one or more faulty sectors and the alternative sectors, wherein the test writing is performed by the test writing part on at least one of the recording sectors and the alternative sectors of the program area of the recording medium at a recording linear velocity the same as that at the time of recording data, thereby determining the optimum recording power by the optimum recording power determination part, and the determined optimum recording power is used at the time of recording data, and wherein the at least one of the recording sectors and the alternative sectors subjected to the test writing are managed as the faulty sectors in the alternation management table and not used as the recording sectors.

According to the above-mentioned aspect of the present invention, it is possible to avoid erroneous recording and faulty recording. At the same time, even when recording is performed according to the CAV method or the ZCLV method adopted for high-speed recording, it is possible to accurately determine an optimum recording power irrespective of areas on a recording medium, i.e., recording linear velocities, variations in each recording medium, or variations in the environment at each time of recording. Hence, it is possible to provide an information recording/reproducing apparatus that significantly improves recording/reproducing characteristics.

In an embodiment of the present invention, the test writing may be performed in the alternative sectors.

In an embodiment of the present invention, the alternative sectors subjected to the test writing may be managed as recording-forbidden sectors in the alternation management table and may not be used as the alternative sectors after the test writing.

In an embodiment of the present invention, the test writing may be performed in the recording sectors and, after the test writing, the recording sectors subjected to the test writing may be treated as the faulty sectors, and the alternative sectors corresponding to the faulty sectors may be managed in the alternation management table.

In the above-mentioned embodiments of the present invention, the sectors subjected to the test writing are not used as the recording sectors at the time of recording data.

Hence, it is possible to avoid erroneous recording and faulty recording that may occur by overwriting the sectors subjected to the test writing.

In an embodiment of the present invention, a plurality of zones may be concentrically formed in the program area in a radial direction thereof, and the alternative sectors may be set (provided) in each of the zones, and the test writing may be performed in the alternative sectors of at least two of the zones, thereby determining the optimum recording powers for each of the two zones by the optimum recording power determination part, and the determined optimum recording powers may be used at the time of recording data.

According to the above-mentioned aspect of the present invention, the optimum recording power is determined for each zone. Hence, it is possible to accurately determine an optimum recording power irrespective of areas on a recording medium, variations in each recording medium, or variations in the environment at each time of recording.

In an embodiment of the present invention, the information recording/reproducing apparatus may further include:

a storing part that stores a previously set optimum recording power; and a correction part that corrects the previously set optimum recording power by predetermined calculation, wherein the corrected optimum recording power is used at the time of recording data.

According to the above-mentioned embodiment, the correction part that corrects the previously set optimum recording power, which is stored in the storing part, by predetermined calculation so as to obtain the corrected optimum recording power is provided. Hence, it is possible to accurately determine an optimum recording power irrespective of areas on a recording medium, variations in each recording medium, or variations in the environment at each time of recording.

Other objects, features and advantages of the present invention will become more apparent from the following detailed description when read in conjunction with the following drawings.

BRIEF DESCRIPTION OF THE DRAWINGS

FIG. 10 is a table showing the format of an alternation management table; and

DETAILED DESCRIPTION OF THE PREFERRED EMBODIMENTS

A description is given below of embodiments of the present invention with reference to the drawings.

First, control in a general optical disk apparatus is described by taking a CD-R and a CD-RW as examples.

Figure 1:
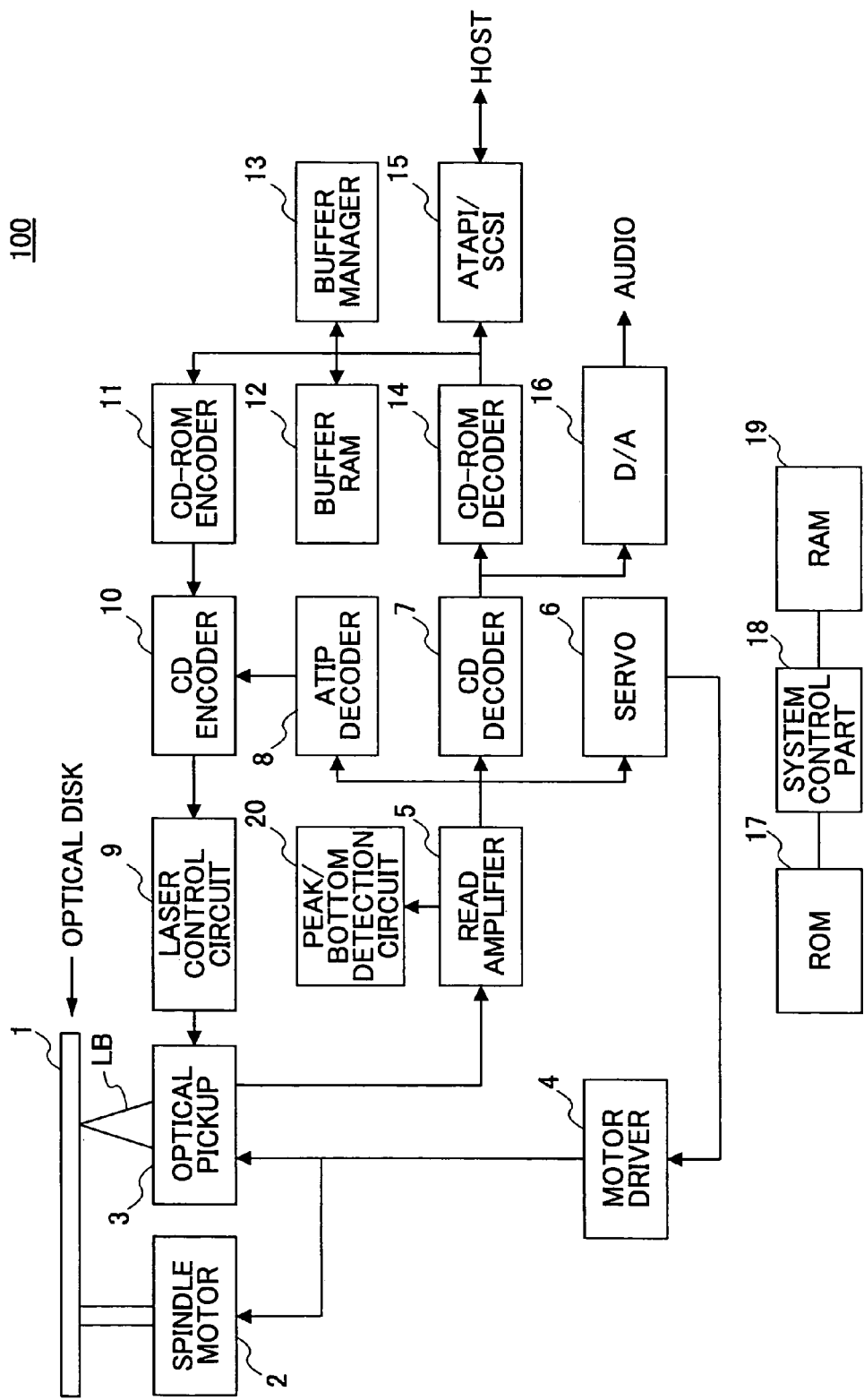
FIG. 1 is a block diagram of an optical disk apparatus, which is an information recording/reproducing apparatus according to the present invention.

FIG. 1 is a functional block diagram showing a partial structure of an optical disk drive 100. The optical disk drive 100 includes a spindle motor 2, an optical pickup 3, a motor driver 4, a read amplifier 5, servo means (servo) 6, a CD decoder 7, an ATIP decoder 8, a laser controller (laser control circuit) 9, a CD encoder 10, a CD-ROM encoder 11, a buffer RAM 12, a buffer manager 13, a CD-ROM decoder 14, an ATAPI/SCSI interface 15, a D/A converter 16, a ROM 17, a system control part 18, a RAM 19, and a peak/bottom detection circuit 20. Additionally, FIG. 1 shows an optical disk 1, a laser beam LB, and an audio output signal AUDIO.

In FIG. 1, arrows indicate the directions of major data flow. In addition, in order to simplify the figure, connections between each block and the system control part 18, which controls each block, are omitted.

The structure and operations of the optical disk drive 100 are as follows. The optical disk 1 is rotated by the spindle motor 2. The spindle motor 2 is controlled by the motor driver 4 and the servo means 6 according to the CLV method or the CAV method.

The optical pickup 3 houses a semiconductor laser, an optical system, a focus actuator, a track actuator, a photodetector, and a position sensor, which are not shown. The optical pickup 3 emits the laser beam LB to the optical disk 1. The optical pickup 3 can be moved in a sledge direction by a seek motor. The focus actuator, the track actuator, and the seek motor are controlled by the motor driver 4 and the servo means 6 based on signals obtained by the photodetector and the position sensor such that the spot of the laser beam LB is located on an aimed at position on the optical disk 1.

At the time of reading, a reproduction signal obtained by the optical pickup 3 is amplified and digitized by the read amplifier 5, and then input to the CD decoder 7. The input digitized data is subjected to EFM (Eight to Fourteen Modulation) in the CD decoder 7. It should be noted that recording data are modulated by EFM in units of 8 bits. In this EFM, 8 bits are converted into 14 bits, and 3 bits are added thereto so as to obtain 17 bits in total. In this case, the 3 bits are added such that the numbers of "1" and "0" become equal on the average.

The demodulated data are subjected to deinterleaving and error correction. Then, the data are input to the CD-ROM decoder 14 and an error correction process is further performed thereon so as to increase reliability of the data. The data subjected to the error correction processes twice in the aforementioned manner is temporarily stored in the buffer RAM 12 by the buffer manager 13, and transferred to a host computer (not shown) at a time via the ATAPI/SCSI interface 15 in a state where the data are aligned as sector data. In the case of music data, data output from the CD decoder 7 are input to the D/A converter 16 and output as an analog audio output signal AUDIO.

At the time of writing, on the other hand, data transmitted from the host computer via the ATAPI/SCSI interface 15 are temporarily stored in the buffer RAM 12 by the buffer manager 13. The writing operation is started with a certain amount of data being stored in the buffer RAM 12. In this case, it is necessary to guide the laser spot to a writing start position before starting the writing operation. The writing start position is obtained from a wobble signal implemented on the optical disk 1 in advance in the form of a meandering track.

The wobble signal includes absolute time information called ATIP, and this information is obtained by the ATIP decoder 8. A synchronization signal generated by the ATIP decoder 8 is input to the CD encoder 10, thereby enabling writing of data to a correct position on the optical disk 1. The data in the buffer RAM 12 are subjected to addition of an error correction code and interleaving in the CD-ROM encoder 11 and the CD encoder 10, and recorded on the optical disk 1 via the laser controller 9 and the optical pickup 3.

The EFM-modulated data drive the laser beam at a channel bit rate of 4.3218 Mbps (standard speed) as a bit stream. Recording data in this case construct an EFM frame in units of 588 channel bits. The channel clock represents the clock frequency of the channel bits.

Referring to the block diagram of FIG. 1, use condition determination means are formed by, for example, the optical pickup 3, the read amplifier 5, the CD decoder 7, and a use condition determination program stored in the system control part 18. Recording linear velocity changing means are formed by, for example, the spindle motor 2, the motor driver 4, the servo 6, and a recording linear velocity changing program stored in the system control part 18.

Recording clock cycle changing means monitor a synchronization signal obtained by reproducing the wobble implemented on the optical disk 1 in advance, and controls a recording clock to provide a target clock frequency that is synchronized with rotation by comparing the velocity and phase of the recording clock with those of the synchronization clock. The recording clock cycle changing means are formed by, for example, a recording clock generator (not shown) and a recording clock cycle changing program stored in the system control part 18. Test writing means are formed by, for example, the laser control circuit 9, the CD encoder 10, and a test writing program stored in the system control part 18. Optimum recording power determination means reproduce data that are test-written by the test writing means and, based on the characteristic value of a reproduction signal, determine the optimum recording power for the recording linear velocity at the time of test writing. The optimum recording power determination means are formed by, for example, an optimum recording power determination program stored in the system control part 18. The storing means are formed by, for example, the ROM 17 and the RAM 19 that are connected to the system control part 18. Correction means are formed by, for example, a correction program stored in the system control part 18.

A description is given below of one embodiment of the present invention.

Figure 2:
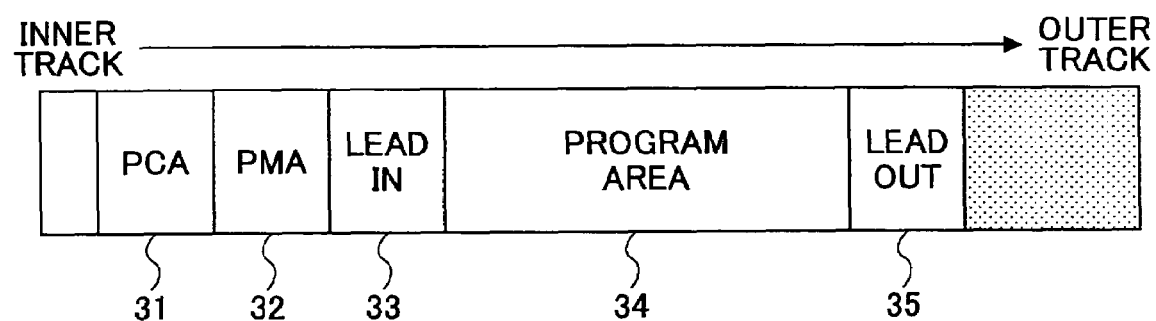
FIG. 2 is a schematic cross-sectional view of an optical disk.

FIG. 2 shows an area structure of an optical disk (recording medium), which is a CD-R or a CD-RW. FIG. 2 is a structure diagram showing a cross section of the optical disk taken in a radial direction. The optical disk includes, from the inner track to the outer track, an inner track PCA 31, a PMA (Program Memory Area) 32, a Lead In area 33, a program area (user area) 34, and a Lead Out area 35. Additionally, it is conceivable to perform test writing by using a PCA provided in tracks (the hatched portion in FIG. 2) radially greater than the Lead Out area. So-called DVD+Rs, DVD+RWs, DVD−Rs and DVD−RWs have the same structure.

Test writing to the optical disk 1 is performed at a predetermined radial position, e.g., the inner track PCA 31, for predetermined steps, e.g., 15 steps, while increasing the recording laser power in increments of 1 mW from an initial value, where 1 sector forms 1 step. That is, test writing is performed with a different recording power for each step. On this occasion, the recording linear velocity is controlled by, for example, the spindle motor 2, the motor driver 4, and the servo means 6 while controlling the clock frequency by the recording clock cycle changing means so that the linear velocity the same as that in an actual recording operation is realized. The optimum recording power determination means reproduce the test-written information and compare the characteristic value of the reproduction signal, thereby determining the optimum recording power for the combination of the recording medium and the recording linear velocity. The series of adjustment of recording power is generally called an OPC (Optimum Power Control) process.

Evaluation of the characteristic value of the reproduction signal is performed in the following manner, for example. A relevant test writing portion is reproduced, the reproduction signal corresponding to a reflected light from the optical pickup 3 is amplified by the read amplifier 5, and the peak/bottom detection circuit 20 detects an upper peak level A1 and a lower peak (bottom) level A2 of the amplified reproduction signal. The detected level signals are subjected to A/D conversion. Then, based on the A/D converted level signals, a $\beta$ value representing a RF signal symmetric property given by a formula: $\beta=(A1+A2)/(A1-A2)$ is calculated by, for example, the system control part 18. The recording power used in a sector in which the $\beta$ value is closest to a target value (e.g., 0.04) is determined as the optimum recording power.

Additionally, in another embodiment of the OPC process, data and data amount are determined in advance (e.g., increment data in units of packets) so that reproduction can be performed by the CD decoder 7 when reproducing a test writing portion, and test writing is performed for a predetermined number of steps (e.g., 10 steps) while changing the recording laser power for each of the steps. Then, a relevant test writing portion is reproduced, and the reproduction signal corresponding to a reflected light from the optical pickup 3 is amplified by the read amplifier 5 and input to the CD decoder 7 so as to calculate by an error detection circuit therein a C1 error rate and a C2 error rate per sector of the reproduction signal for each packet. The recording power used in a packet in which the error rate is lowest is determined as the optimum recording power.

Generally, a rewritable recording medium represented by a CD-RW allows DOW (Direct Over Write), that is, direct recording on a recorded area as well as an unrecorded area by overwriting the recorded state. Normally, recording is performed in the aforementioned manner. Therefore, it does not matter if recording is performed on an unrecorded area of the optical disk 1, which allows overwriting, since it is assumed that recorded information is lost when overwritten. By using this feature, the present invention determines the use condition of a recording medium (optical disk) before the OPC process, and performs the OPC process not only on the PCA 31 or the portion radially greater than the Lead Out area 35 but also on the entire surface of the recording medium under the condition the same as an actual recording condition.

Figure 3:
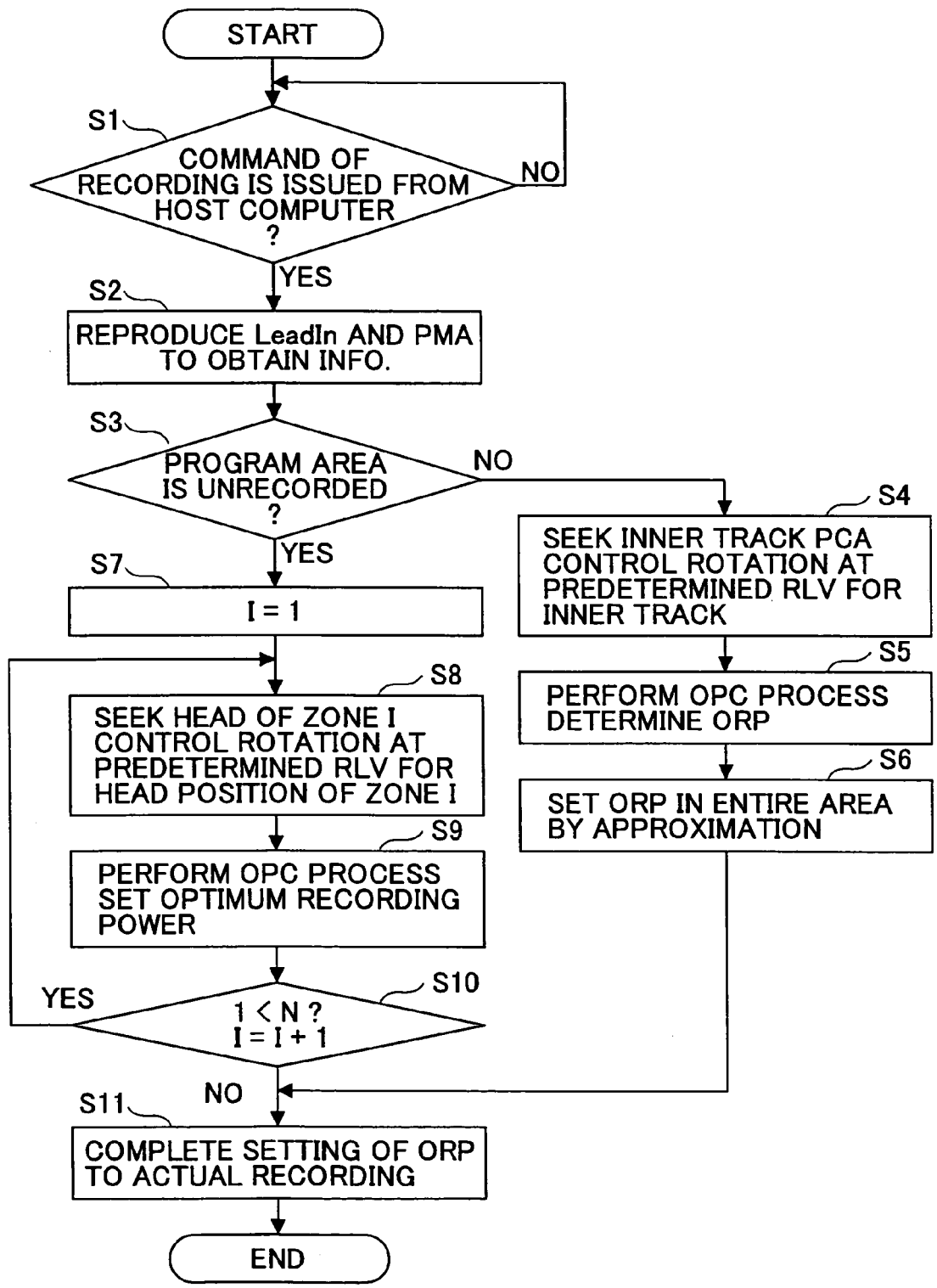
FIG. 3 is a flowchart showing an information recording flow according to one embodiment of the information recording/reproducing apparatus of the present invention.

FIG. 3 shows a flowchart for determining an optimum recording power in the above-mentioned case. In step S1, it is determined whether a command of recording is issued by the host computer. Upon reception of the command, first, before recording, information in the Lead In area (specific area) 33 and the PMA (specific area) 32 is reproduced in step S2. In step S3, it is determined by the system control part (use condition determination means) 18 whether recording is already performed on the optical disk 1 (whether there is an unused area). Steps S2 and S3 may be performed when the optical disk 1, which is a recording medium, is inserted into an information recording/reproducing apparatus.

In the case where recording is already performed in the program area (user area) 34 (NO in step S3), the process proceeds to step S4. In step S4, the inner tracks are sought so as to perform the OPC process as in the conventional case, and rotation of the spindle motor 2 is controlled by the recording linear velocity changing means to be a recording linear velocity (RLV) for recording on a relevant portion. In step S5, the OPC process is performed, and an optimum recording power is determined by the optimum recording power determination means. In step S6, the determined optimum recording power is corrected, and a recording condition for the entire surface of the optical disk 1 is determined. Such a technique is disclosed in, for example, Japanese Laid-Open Patent Application No. 2002-170237.

Figure 4:
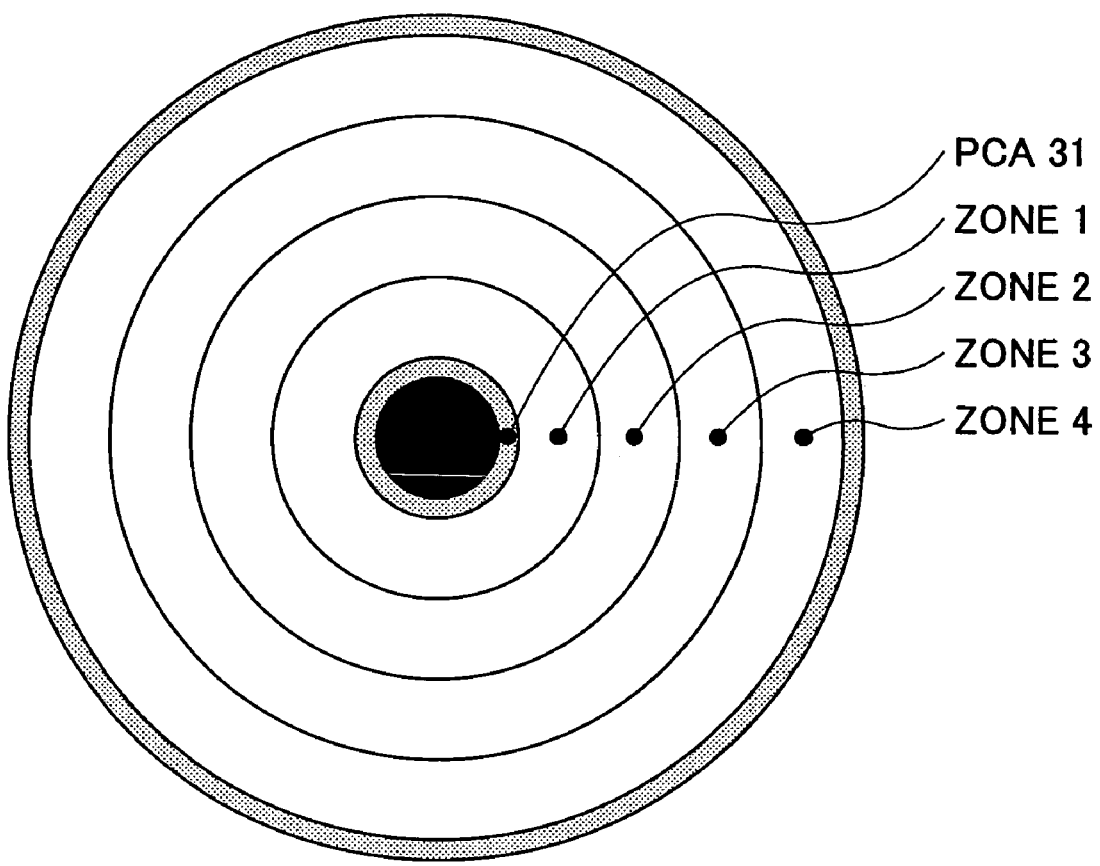
FIG. 4 is a schematic diagram showing the optical disk of FIG. 2 divided into zones.

On the other hand, in the case where no area of the program area 34 is used, that is, when all areas are unused (YES in step S3), I is set to 1 in step S7, and plural zones (e.g., five zones including the PCA 31) are concentrically formed in the program area 34 in the radial direction as shown in FIG. 4. In step S8, the head portion of each zone is sought to perform the OPC process in the boundary portion of each zone under the condition (e.g., recording linear velocity=rotation control, or pulse strategy) the same as that in an actual recording operation, and the rotation of the spindle motor 2 is controlled for each zone by the recording linear velocity changing means such that the recording linear velocity (RLV) for recording a relevant portion is achieved.

In step S9, the OPC process is performed by the test writing means so as to determine (set) the optimum recording power (ORP) in a relevant zone. Alternatively, the optimum recording power previously set for each zone may be stored in the storing means, and the stored optimum recording power may be corrected through calculation by the correction means.

When there is a partial unused area in the program area 34, test writing may be performed on the unused area by the test writing means at the recording linear velocity the same as that in recording information, the optimum recording power for the area or zone may be determined by the optimum recording power determination means, and information may be recorded with the determined optimum recording power at the time of recording information.

The optimum recording power is finely determined for all of the zones by repeating the above-mentioned operation for each of the previously determined zones. In step S10, whether I<N is satisfied is determined. When I<N (YES in step S10), I is incremented by 1 and the process returns to step S8. When I≧N (NO in step S10), the process proceeds to step S11. After determining the optimum recording power in the aforementioned manner, an actual recording process is performed in step S11. It is to be appreciated that, in the present invention, the larger the number of zones becomes, the more accurately the recording control can be performed. Even when the rotation control method is not the CAV method but the ZCLV method in which the recording linear velocity is controlled to be constant in each zone., similar effects can be obtained by applying the present invention. Further, a previously arranged optimum recording power for a recording medium may be stored in the storing means in advance, and the previously arranged optimum recording power may be corrected through predetermined calculation by the correction means based on the optimum recording power determined by the optimum recording power determination means.

Figure 5:
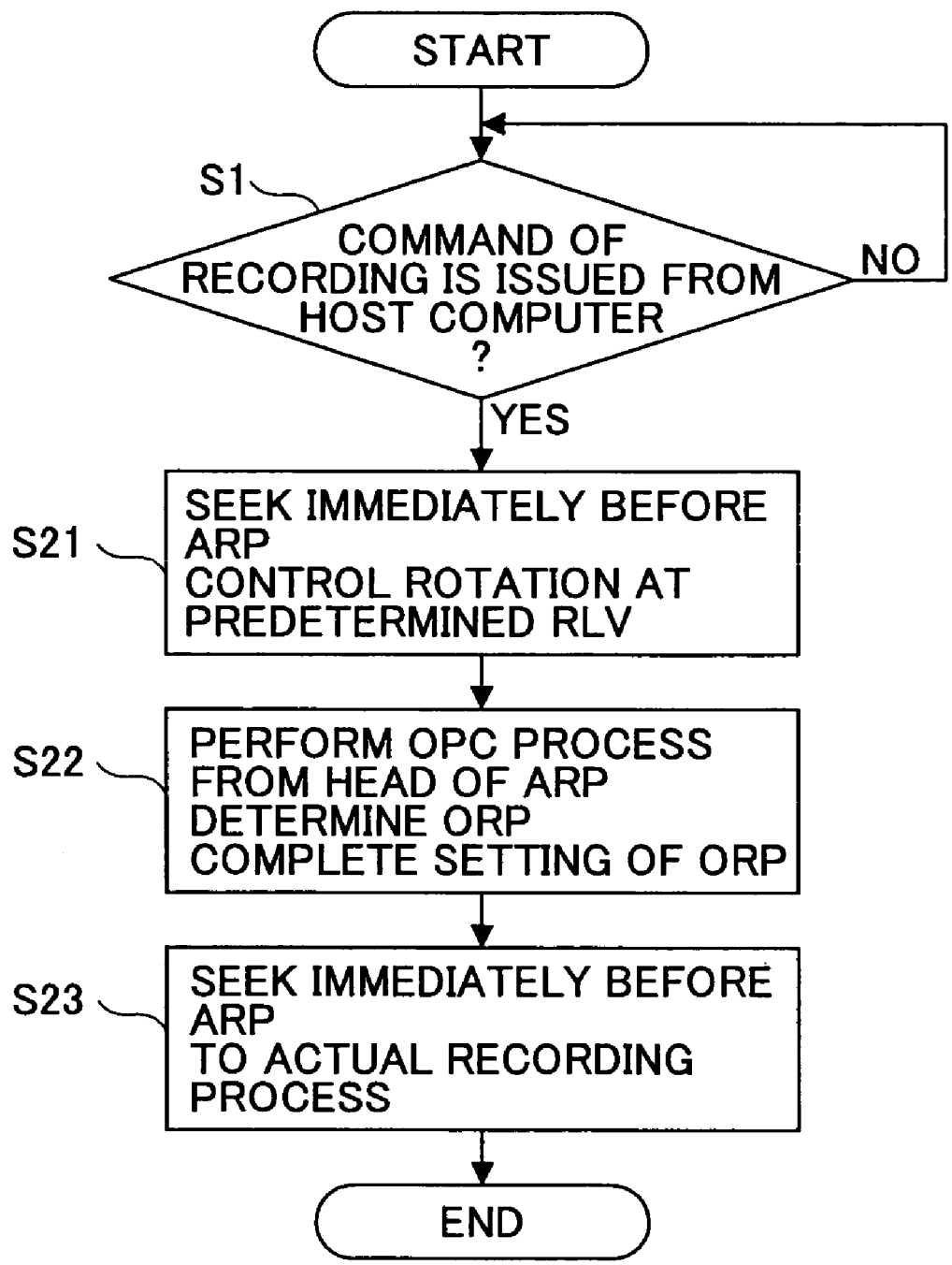
FIG. 5 is a flowchart showing an information recording flow according to another embodiment of the information recording/reproducing apparatus of the present invention.

FIG. 5 is a flowchart of another embodiment of the present invention.

As mentioned above, a recording medium represented by a CD-RW allows direct recording according to the DOW method in which a recorded area is overwritten, and recording is normally performed in this manner. Therefore, it does not matter if information is recorded before an actual recording operation on the optical disk 1, which allows overwriting, at a portion where a recording operation is to be performed, as long as proper information is recorded again on the portion.

Conventionally, an optimum recording power is obtained by performing test writing on a specially provided test writing area at a recording linear velocity and under a recording condition that may be different from those in actual recording. In the present invention, however, test writing is performed before actual recording at a position where recording is to be actually performed by a recording instruction, that is, the head portion of the user area, under the condition (recording linear velocity and/or other recording condition) the same as that in actual recording, and an accurate optimum recording power determined by the test writing is set, and a proper recording process is performed with the determined optimum recording power.

In step S1, it is determined whether a command of recording is issued by the host computer. Upon reception of the command, in step S21, the head portion on which actual recording is to be performed is sought before actual recording, and the rotation of the spindle motor 2 is controlled by the recording linear velocity changing means such that the recording linear velocity for recording the relevant portion is achieved. In step S22, the OPC process is performed by the test writing means from the position the same as that in actual recording, and an optimum recording power for the relevant portion is determined by the optimum recording power determination means.

Data to be recorded in the OPC process may be data to be recorded in actual recording or specific data dedicated for test writing. When recording is performed while increasing the recording power for each step, it is preferable to perform test writing by using a loss-less inking function and repeat recording and temporarily stop recording while changing the recording power for every several sectors. This is because in this case it becomes easier to evaluate the characteristic value at the time of reproducing. After determining the optimum recording power (ORP) in the aforementioned manner, an actual recording process is performed in step S23.

Figure 6:
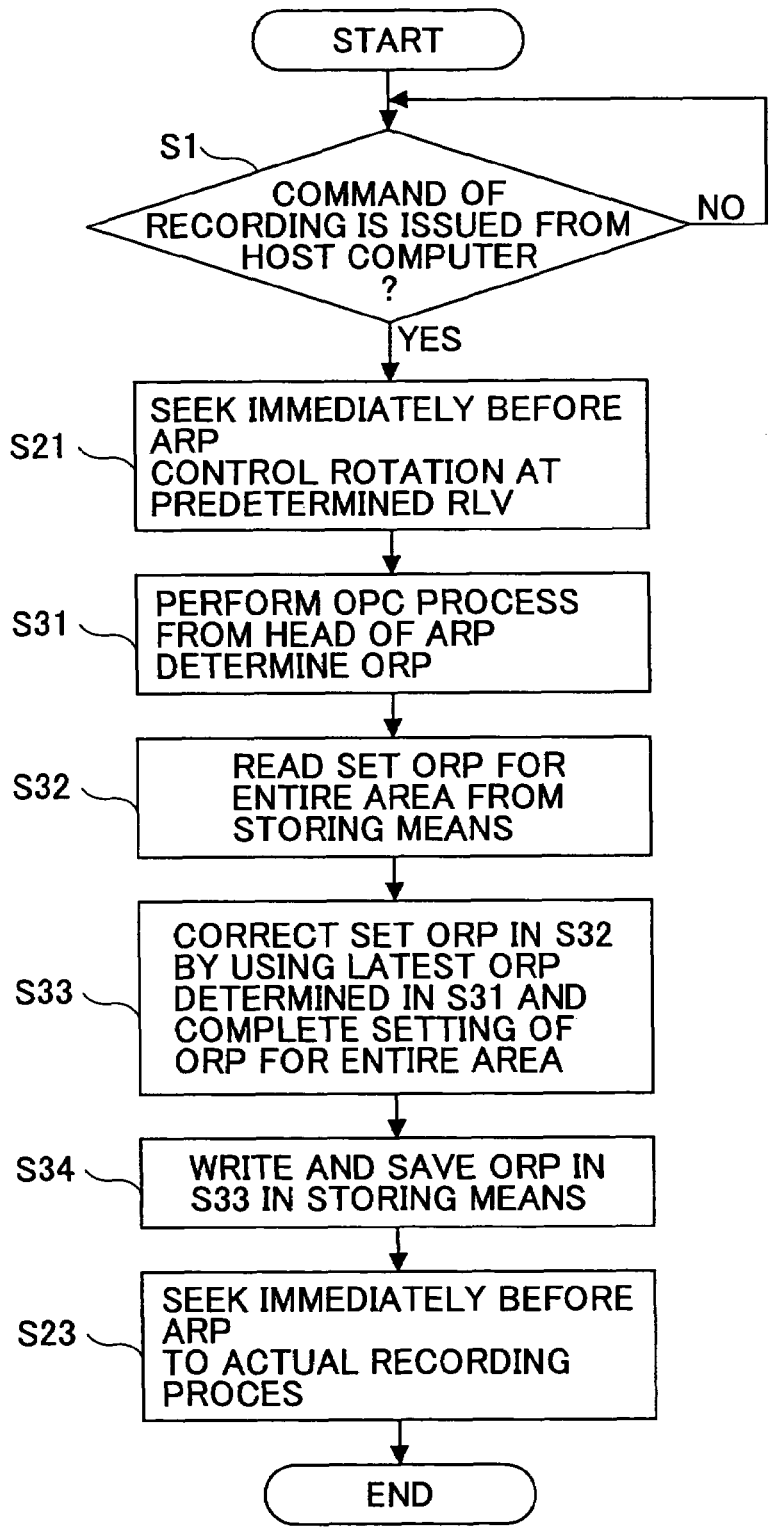
FIG. 6 is a flowchart showing an information recording flow according to still another embodiment of the information recording/reproducing apparatus of the present invention.

FIG. 6 is a flowchart of still another embodiment of the present invention.

In step S1, it is determined whether a command of recording is issued by the host computer. Upon reception of the command, in step S21, the head portion on which actual recording is to be performed is sought before actual recording, and the rotation of the spindle motor 2 is controlled by the recording linear velocity changing means such that the recording linear velocity for recording the relevant portion is achieved. In step S31, the OPC process is performed by the test writing means from the position the same as that in actual recording so as to determine the optimum recording power for the relevant portion by the optimum recording power determination means. In step S32, previously set optimum recording powers for the entire area are read from the storing means in the information recording/reproducing apparatus. In step S33, by using the optimum recording power for the actual recording position determined in step S31, all of the previously set optimum recording powers for the entire areas are corrected by the correction means through predetermined calculation and/or a difference value, and the corrected optimum recording powers are adopted as set values. In step S34, the set values are written to the storing means so as to update the current set values. After determining the optimum recording powers in the aforementioned manner, an actual recording process is performed in step S23.

A description is given below of a general defect management system used for an optical information recording medium (optical disk).

An optical disk apparatus, which is an information recording/reproducing apparatus, records data on and/or reproduced data from an optical disk. Some optical disk apparatuses install a defect management system in order to assure reliability of recorded data even if, for example, an optical disk includes a defect produced at the time of fabrication of the optical disk, and/or an optical disk includes a defect due to degradation of the optical disk caused by a scratch and/or repetitive recording and erasing of data.

In such a defect management system, when there is a defect in a recording sector, the recording sector is treated as a faulty sector and the faulty sector is substituted for by an alternative sector. The defect management system includes two typical methods.

Figure 7:
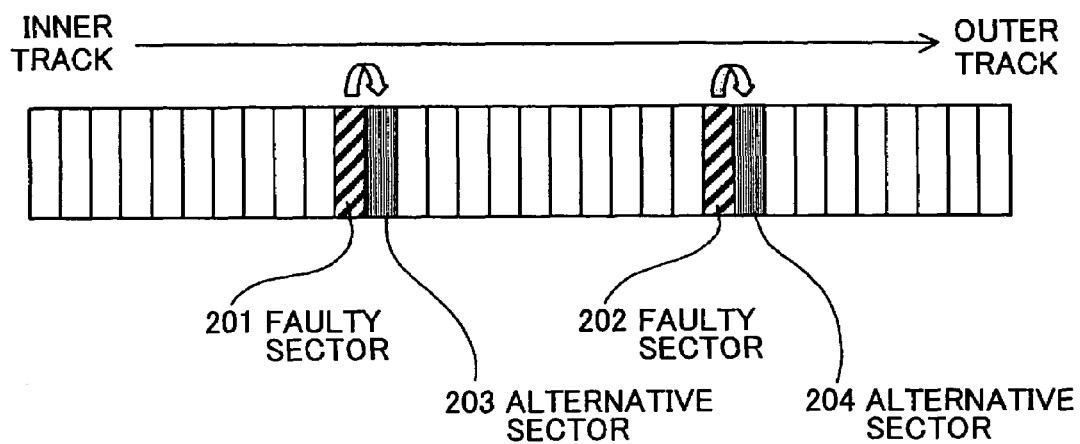
FIG. 7 is a schematic cross-sectional view of the user area of an optical disk, which is a recording medium used in the information recording/reproducing apparatus according to the present invention.
Figure 8:
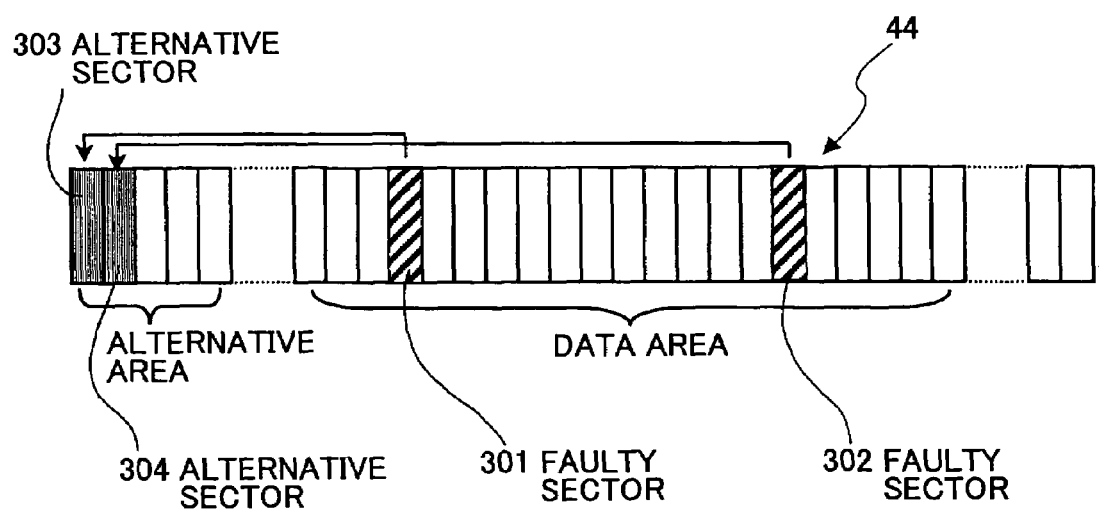
FIG. 8 is a schematic cross-sectional view of the entire optical disk of FIG. 7.

One of the typical methods is the sector slip method. In the sector slip method, when there are faulty sectors 201 and 202 as shown in FIG. 7, the subsequent alternative sectors 203 and 204 are used instead, respectively. The other of the typical methods is the linear substitution method. In the linear substitution method, a data area and an alternative area are provided as shown in FIG. 8. When there are first and second faulty sectors 301 and 302 in the data area, first and second alternative sectors 303 and 304 in the alternative area are used instead of the faulty sectors 301 and 302, respectively.

Referring to FIG. 7, a brief description is given below of the operation in the sector slip method.

FIG. 7 shows a part of data on an optical disk in the unit of sectors: the faulty sector 201 and the adjacent alternative sector 203, and the faulty sector 202 and the adjacent alternative sector 204. In addition, an alternation management table managing the positions of faulty sectors and alternative sectors is provided in another area on the optical disk. Further, it is assumed that a control circuit performing a defect process is embedded in a drive (information recording/reproducing apparatus).

First, the optical disk is inserted into the drive. When an upper apparatus accesses a normal sector having no defect of the optical disk, data are written to or read from the normal sector. However, when access is made to the faulty sector 201 or 202, data are not written to or read from the faulty sector 201 or 202. Instead, the data are written to or read from the subsequent alternative sector 203 or 204, respectively, in accordance with information written to a faulty sector position management table. As mentioned above, in the sector slip method, when there is a faulty sector, reading or writing is performed to the subsequent sector by slipping from the faulty sector to the subsequent sector.

Referring to FIG. 8, a brief description is given below of the linear substitution method.

FIG. 8 shows a part of data on an optical disk in units of sectors: the first faulty sector 301 and the second faulty sectors 302 in the data area, and the first alternative sector 303 and the second alternative sector 304 in the alternative area. In addition, a faulty sector position management table is provided in another area on the optical disk. Further, similar to the above-mentioned sector slip method, a control circuit performing a defect process is embedded in a drive.

First, the optical disk is inserted into the drive. When an upper apparatus accesses a normal sector having no defect of the optical disk, data are written to or read from the normal sector. However, when the faulty sector 301 or 302 of the optical disk is accessed, data are not written to or read from the faulty sector 301 or 302. Instead, the data are written to or read from the alternative sector 303 or 304 by a reading/writing head in accordance with information written to the faulty sector position management table.

Figure 9:
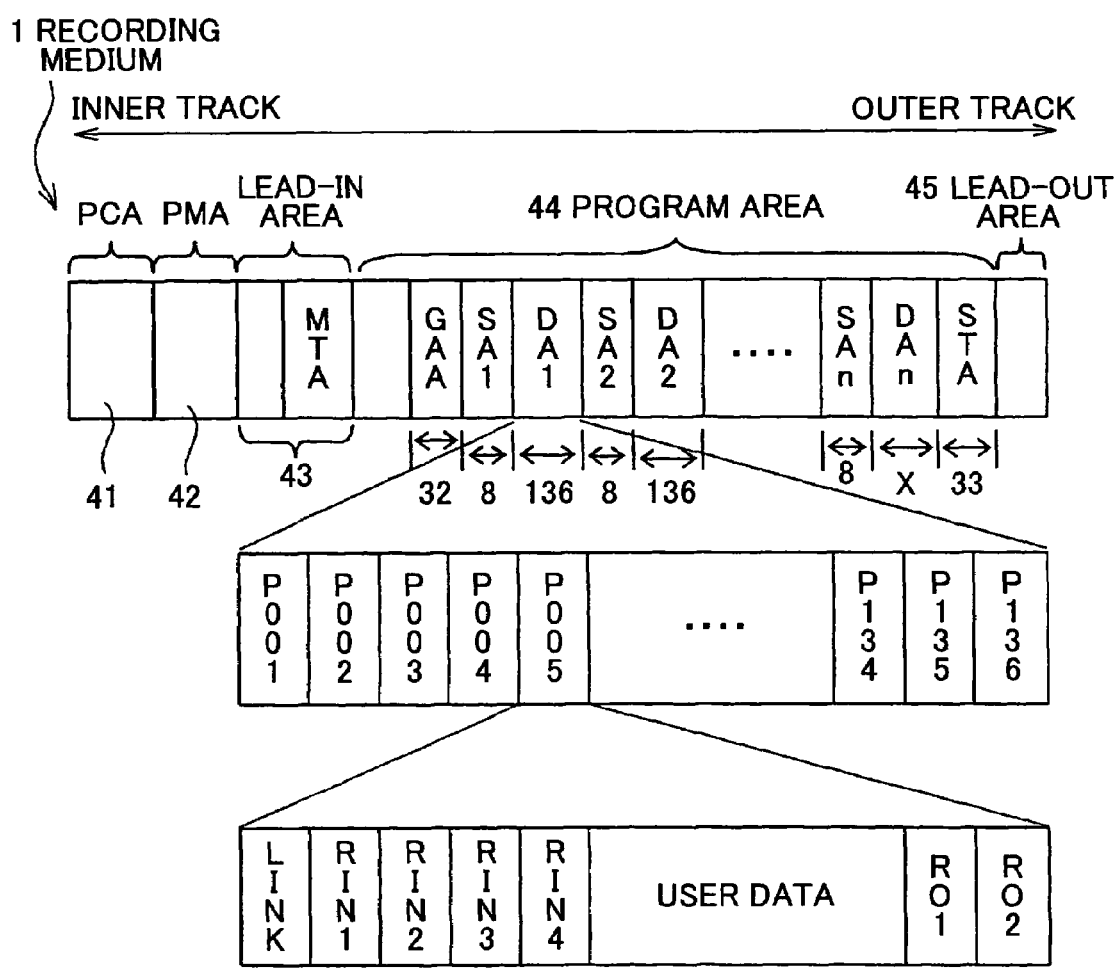
FIG. 9 is a schematic diagram showing the area structure of an optical disk, which is a recording medium used in the information recording/reproducing apparatus according to the present invention.

Referring to FIG. 9, a description is given below of an illustrative embodiment of the Mt. Rainier Standard (hereinafter referred to as "CDMRW") of CDs, which is standardized as one of the linear substitution methods.

FIG. 9 is a cross-sectional view of an optical disk, which is a CD-R or a CD-RW, taken along a radial direction to show the area structure. The part corresponding to the upper stage in FIG. 9 includes an information area formed by, from the inner track to the outer track, a PCA 41, a PMA (program memory area) 42, a Lead-In area 43, a program area 44, and a Lead-Out area 45.

It should be noted that DVD+Rs, DVD+RWs, DVD−Rs, and DVD−RWs have similar structures.

The part corresponding to the middle stage in FIG. 9 shows a part of the program area 44, which part is formed by: a plurality of spare areas (including a plurality of alternative sectors as an alternative area for faulty sectors) SA1 through SAn; data areas (including a plurality of recording sectors as a normal data area) DA1 through DAn allocated to make pairs with the corresponding spare areas SA1 through SAn; and a secondary table area (STA) (a second table area for supplementing the MTA).

The spare areas SA1 through SAn and the data areas DA1 through DAn are used in pairs. The spare areas SA1 through SAn include alternative sectors substituted for recording sectors for recording and/or reproducing of data when the recording sectors include defects and are treated as faulty sectors. The data areas DA1 through DAn include the recording sectors for recording data. For example, the alternate for the data area DA1 is the spare area SA1. Even if the spare area SA1 includes a large free space, the spare area SA1 does not become the alternate for the data area DA2. However, when the area of the spare area SA1 is used up because many alternations are made for the data area DA1, the spare area SA2 may be an alternate for the data area DA1.

The size of the data areas DA1 through DAn and the size of spare areas SA1 through SAn are limited to a certain rate. This is because, if a large area is used for the spare areas SA1 through SAn, then the data areas DA1 through DAn allowing recording of an optical disk are reduced. In the CDMRW, it is set that a single spare area includes 8 packets (8×39=312 sectors) and a single data area includes 136 packets (136× 39=5304 sectors), and a plurality of pairs of the data area and the spare area exist.

As shown in the lower stage in FIG. 9, a single packet is formed by 32 sectors that can be actually used as the program area 44 and 7 sectors for a link area that is provided so that the program area 44, having 32 sectors, can be reproduced with a high degree of reliability when data are written over packets. Accordingly, in a single spare area of 8 packets, the number of sectors than can be actually used as alternative sectors is 32×8=256 sectors.

The STA provided in the last of the program area 44 is a defect management table, which is a defect management table that can be read from a CD-ROM and corresponds to a spare area (an area in which completely the same information is recorded) for a main table area (MTA) provided in the Lead-In area 43. The MTA provided in the Lead-In area 43 is the alternation management table.

FIG. 10 is an explanatory diagram showing a format of the alternation management table (MTA).

In this alternation management table, which is a table related to the spare area SA1 shown in FIG. 9, the number of a main defect table (MDT) is "0", and the number of a defect table block (DTB) is also "0". When the number of the MDT is "0" and the number of the DTB is "1", a table corresponding to the spare area SA2 is shown. The numbers of the MDT are "0" through "7", and the numbers of the DTB are also "0" through "7". Hence, with the combinations of the MDT and the DTB, it is possible to provide 64 tables in total for spare areas SA1 through SA64.

In the alternation management table, by referring to faulty addresses and alternative addresses of the section whose entry type is "real location entry", it is possible to find alternation information of the spare area SA1. In the case of FIG. 10, the faulty addresses are 005A0 through 005C0, and the data thereof are substituted for by addresses 00400 through 00420, respectively.

The section whose entry type is "free entry" shows the addresses of usable alternative areas, i.e., spare areas SA that are unused. The section whose entry type is "unusable entry" shows the faulty addresses of faulty areas, the faulty address representing addresses the use of which is prohibited (recording-forbidden sectors). When there is a request for recording with respect to addresses including an address the use of which is prohibited, the address is substituted for by an alternative address.

As mentioned above, the alternation management table is related to the spare area SA1. In the spare area SA1, the information of the areas whose addresses are 005A0 through 005C0 are substituted for by that of the areas whose addresses are 00400 through 00420, respectively. Also, it is appreciated that the areas whose addresses are 00422 and 00428, which are faulty addresses, are recording-forbidden areas.

In the CDMRW, congenital (original) defects of an optical disk are registered at the time of initialization of the optical disk. An address at which, for example, a recording error occurs at the time of initialization/a reproduction error occurs during a verify operation performed at the time of initialization is registered in the unusable entry of an alternation management table, and this address is set to be a recording-forbidden address.

With respect to acquired defects of an optical disk, for example, when an error occurs during recording/a verify process after recording and alternation is performed, an address at which the error occurs and the alternative address thereof are registered in the real location entry.

In such an optical disk apparatus, when there is a data recording request from the host computer, it is determined by referring to the alternation management table (MTA) whether a faulty region exists within a recording area of an optical disk which area is requested by the host computer. When the recording request is issued with respect to an area including a faulty area, the data the same as that recorded in the faulty area are also recorded in a spare area SA, which is the alternative area for the faulty area. Also, faulty address information of the faulty area and alternative address information (alternation information) of the alternative area are registered in the alternation management table (MTA), thereby performing defect management.

On the other hand, when there is a reproduction request from the host computer with respect to an optical disk recording the data thereon in the aforementioned manner, first, by referring to the alternation management table (MTA), it is determined whether a data area to be reproduced includes alternative address information. When the alternative address information is included, data are reproduced from the data areas DA and the spare areas SA included in the alternative address information corresponding to the faulty address information of the data areas DA, and transferred to the host computer.

Figure 11:
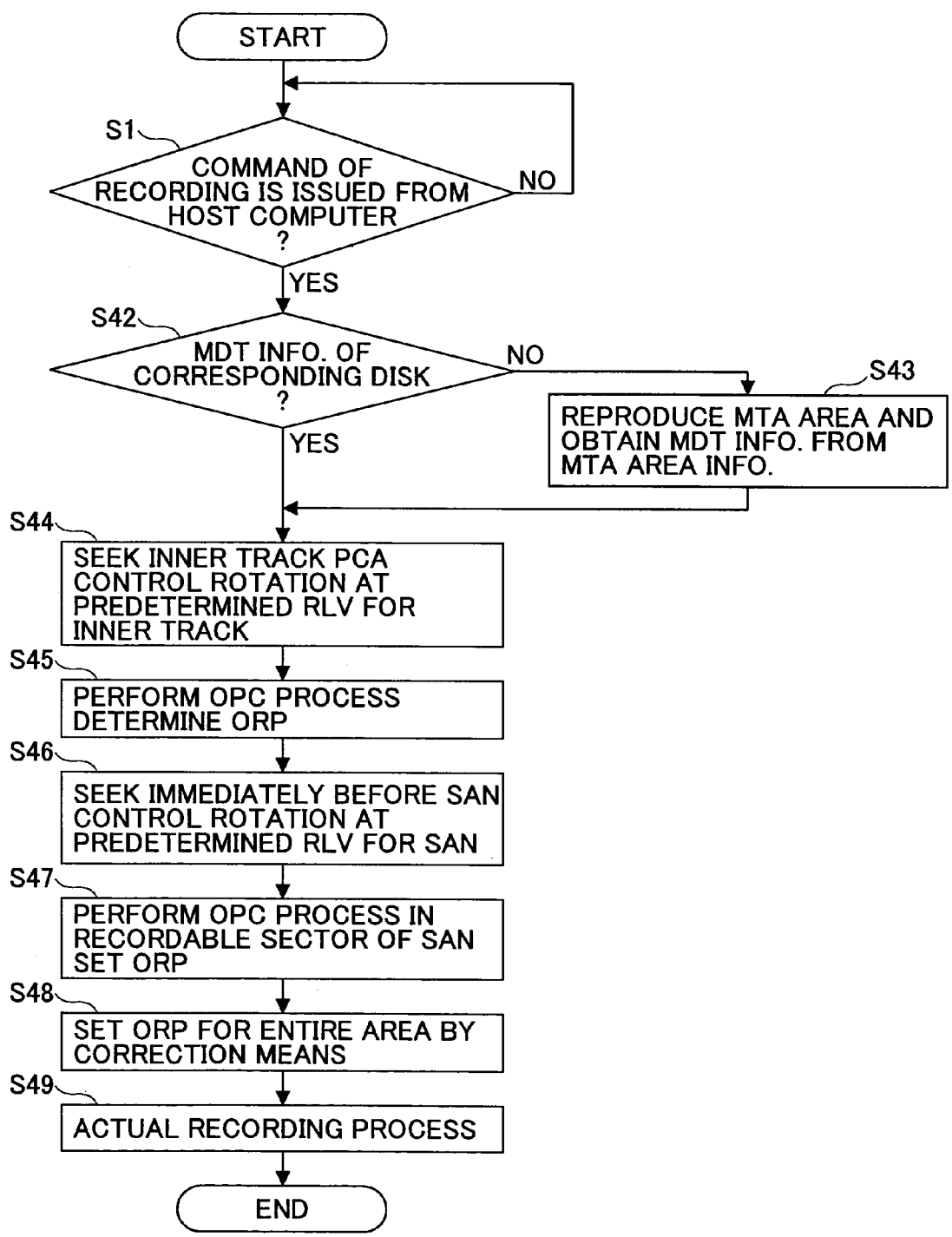
FIG. 11 is a flowchart showing the flow for setting optimum recording powers for a recording medium by using the information recording/reproducing apparatus according to the present invention.

Referring to FIG. 11, a description is given below of one embodiment of the information recording/reproducing apparatus of the present invention.

In step S1, it is determined whether a command of recording is issued from the host computer. Step S1 is repeated until the decision result becomes YES. Upon reception of the command (YES in step S1), before recording, it is determined in step S42 whether an alternation management table includes information. When the alternation management table does not include information (NO in step S42), the process proceeds to step S43. In step S43, the information in the Lead-In area 43 and the PMA 42 of the optical disk 1 is reproduced, the alternative management table information is stored in the storing means (e.g., RAM, FLASH or EEPROM) managed by the system control part 18 or in the storing means (the buffer RAM 12) managed by the buffer manager 13, and the position to be subjected to the OPC process is determined.

Here, it is assumed that the OPC process is performed on, for example, two areas, i.e., the PCA 41 that is a dedicated area and the spare area SAn (SAN) located in the outermost track portion. First, in step S44, the inner track is sought so as to perform the OPC process on the PCA 41, and the rotation of the spindle motor 2 is controlled to achieve the recording linear velocity for recording the relevant portion. In step 45, the OPC process is performed and the optimum recording power for the recording linear velocity is determined. In step S46, in order to perform the OPC process on the SAn located on the outermost track portion, the portion immediately before the SAn is sought and the rotation of the spindle motor 2 is controlled to achieve the recording linear velocity for recording the relevant portion.

In step S47, the OPC process is performed. In this OPC process, test writing is performed by the test writing means on recording sectors other than recording-forbidden sectors (unusable entry) and alternative sectors (real location entry) within the SAN obtained from the alternation management table information, that is, free entry, at the recording linear velocity the same as that at the time of recording data to the recording sectors or alternative sectors of the program area of the optical disk, and the optimum recording power for this recording linear velocity is determined by the optimum recording power determination means. In step S48, the previously set optimum recording powers stored in the storing means are corrected by the correction means by predetermined calculation using the optimum recording powers in the inner track and the outer track determined in steps S45 and S47, respectively. Thereby, the optimum recording conditions (optimum recording powers) for the entire area of the optical disk 1 are determined. It is to be appreciated that, in this embodiment, the larger the number of portions in the spare areas SA1 through SAn subjected to the OPC process is, the more accurately the recording control can be performed.

In addition, test writing may be performed on recording sectors or alternative sectors in the program area 44 and, after the test writing, the sectors subjected to the test writing may be managed as faulty sectors in an alternation management table and may be made not to be used as recording sectors at the time of recording.

Further, test writing may be performed in recording sectors and, after the test writing, the recording sectors may be treated as faulty sectors and the alternative sectors corresponding to the faulty sectors may be managed in an alternation management table.

Additionally, alternative sectors in the spare areas SA1 through SAn used in the OPC process may be treated as recording-forbidden sectors and may be managed as an unusable entry in an alternative management table.

Furthermore, it is preferable to read optimum recording powers previously set to a recording medium, and perform predetermined calculation based on the differences between the previously set optimum recording powers and the latest optimum recording powers determined in steps S4 and S7, thereby correcting the previously set optimum recording powers (optimum recording conditions) for the entire area of the optical disk 1. The predetermined calculation may be, for example, addition/subtraction of the difference values between the previously set optimum recording powers and the latest optimum recording powers with respect to all of the previously set optimum recording powers.

On the other hand, when no area of the program area 44 is used, that is, all areas are unused, at least two concentric zones are formed in the program area 44 of the optical disk 1, each of the zones is provided with alternative sectors, and the OPC process is performed on the boundary portion of each of the zones under the conditions (e.g., recording linear velocity rotational control or pulse strategy) the same as those at the time of recording data.

The OPC process is performed by the test writing means and the optimum recording power determination means, thereby determining the optimum recording power for a relevant zone. On this occasion, the optimum recording power previously set for each of the zones may be stored in the storing means in advance, and the optimum recording powers may be obtained by correcting the previously set optimum recording powers through predetermined calculation by the correction means.

On this occasion, when referring to the previously set optimum recording powers, the recording power may be varied in the vicinity of the previously set values. In this case, the OPC process is performed such that the number of steps is smaller than that of the normal OPC process. It is preferable to perform such control because the time period required for the OPC process can be reduced. In addition, it is more preferable to save the result of the OPC process in the storing means again. Further, regarding the above-mentioned calculation, it is more preferable to perform complicated calculation that provides further higher accuracy.

In the aforementioned manner, even if recording linear velocity varies depending on the recording position in a radial direction as in the CAV method or the ZCLV method, it is possible to obtain the optimum recording powers for the inner tracks and the outer tracks. Thus, it is possible to determine the optimum recording powers (optimum recording conditions) for the entire surface (area) of an optical disk. In the present invention, it is to be appreciated that the larger the number of the zones is, the more accurately the recording control can be performed. Additionally, even if the rotational control method is not the CAV method but the ZCLV method in which recording linear velocity is controlled to be constant in each zone, it is possible to obtain similar effects by applying the present invention.

The above description is given by taking recording on a CD as an example. However, it is to be appreciated that the present invention can be similarly applied to recording on a DVD.

The present invention is not limited to the specifically disclosed embodiments, and variations and modifications may be made without departing from the scope of the present invention.

The present application is based on Japanese Priority Applications No. 2003-299758 filed on Aug. 25, 2003 and No. 2003-299760 filed on Aug. 25, 2003, the entire contents of which are hereby incorporated by reference.

What is claimed is:

1. An information recording/reproducing apparatus that records information on and/or reproduces information from an optical disk recording medium allowing rewriting of information, said information recording/reproducing apparatus comprising:

a use condition determination part that reproduces a program area on the recording medium and determines whether the program area includes an unused area where no information is recorded;

a recording linear velocity changing part that changes a recording linear velocity in a radial direction of the recording medium;

a recording clock cycle changing part that changes a recording clock cycle in accordance with a change in the recording linear velocity;

a test writing part that performs test writing on the recording medium with a different recording power for each step; and an optimum recording power determination part that reproduces information that is written on the recording medium in the test writing by the test writing part and determines an optimum recording power for the recording linear velocity at the time of the test writing based on a characteristic value of a reproduction signal, wherein, when the use condition determination part determines that the program area includes the unused area, the test writing part performs the test writing on the unused area in the program area at the recording linear velocity the same as that at the time of recording information, the optimum recording power determination part determines the optimum recording power based on the test writing to the unused area in the program area, and when recording information, the information is recorded with the optimum recording power determined based on the test writing to the unused area in the program area.

2. The information recording/reproducing apparatus as claimed in claim 1, wherein, when the use condition determination part determines that a user area of the recording medium is all unused, a plurality of concentric zones are formed in the radial direction of the user area of the recording medium, the test writing part performs the test writing on the zones at the recording linear velocity the same as that at the time of recording information, the optimum recording power determination part determines the optimum recording power for each of the zones, and when recording information in each of the zones, the information is recorded with the optimum recording power corresponding to the zone.

3. The information recording/reproducing apparatus as claimed in claim 2, further comprising:

a storing part that stores a previously set optimum recording power for each of the zones; and a correction part that corrects the previously set optimum recording power by predetermined calculation based on the optimum recording power.

4. An information recording/reproducing apparatus that records information on and/or reproduces information from an optical disk recording medium allowing rewriting of information, said information recording/reproducing apparatus comprising:

a recording linear velocity changing part that changes a recording linear velocity in a radial direction of the recording medium;

a recording clock cycle changing part that changes a recording clock cycle in accordance with a change in the recording linear velocity;

a test writing part that performs test writing on the recording medium with a different recording power for each step; and an optimum recording power determination part that reproduces information that is written on the recording medium in the test writing by the test writing part and determines an optimum recording power for the recording linear velocity at the time of the test writing based on a characteristic value of a reproduction signal, wherein, when a record command is received from an external host computer, the test writing part performs the test writing on a head portion of a user area of the recording medium at the recording linear velocity the same as that at the time of recording information, the optimum recording power determination part determines the optimum recording power based on the test writing after the record command is received, and information is recorded with the optimum recording power determined based on the test writing performed after the record command is received.

5. The information recording/reproducing apparatus as claimed in claim 4, further comprising:

a storing part that stores a previously set optimum recording power for each of concentric zones formed in the user area in the radial direction; and a correction part that corrects the previously set optimum recording power by predetermined calculation.

6. An information recording/reproducing apparatus that records data on and/or reproduces data from a recording medium having a program area that includes a plurality of recording sectors to which data are recorded and a plurality of alternative sectors, one or more of the recording sectors including a defect, the one or more recording sectors being treated as one or more faulty sectors, and corresponding ones of the alternative sectors being substituted for the faulty sectors, said information recording/reproducing apparatus comprising:
- a test writing part that performs test writing of data on the recording medium with a different recording power for each step;
- an optimum recording power determination part that determines an optimum recording power; and
- an alternation management table for managing the one or more faulty sectors and the alternative sectors,
- wherein the test writing is performed by the test writing part on at least one of the recording sectors and the alternative sectors of the program area of the recording medium at a recording linear velocity the same as that at the time of recording data, thereby determining the optimum recording power by the optimum recording power determination part, and the determined optimum recording power is used at the time of recording data, and
- wherein the at least one of the recording sectors and the alternative sectors subjected to the test writing are managed as the faulty sectors in the alternation management table and not used as the recording sectors.

7. The information recording/reproducing apparatus as claimed in claim 6, wherein the test writing is performed in one or more of the alternative sectors.

8. The information recording/reproducing apparatus as claimed in claim 7, wherein the one or more of the alternative sectors subjected to the test writing are managed as recording-forbidden sectors in the alternation management table and not used for recording user data after the test writing.

9. The information recording/reproducing apparatus as claimed in claim 8,
- wherein a plurality of zones are concentrically formed in the program area in a radial direction thereof, and corresponding ones of the alternative sectors are set in each of the zones, and
- wherein the test writing is performed in the corresponding ones of the alternative sectors of at least two of the zones, thereby determining the optimum recording powers for each of the at least two zones by the optimum recording power determination part, and the determined optimum recording powers are used at the time of recording data.

10. The information recording/reproducing apparatus as claimed in claim 8, further comprising:
- a storing part that stores a previously set optimum recording power; and
- a correction part that corrects the previously set optimum recording power by predetermined calculation,
- wherein the corrected optimum recording power is used at the time of recording data.

11. The information recording/reproducing apparatus as claimed in claim 7,
- wherein a plurality of zones are concentrically formed in the program area in a radial direction thereof, and corresponding ones of the alternative sectors are set in each of the zones, and
- wherein the test writing is performed in the corresponding ones of the alternative sectors of at least two of the zones, thereby determining the optimum recording powers for each of the at least two zones by the optimum recording power determination part, and the determined optimum recording powers are used at the time of recording data.

12. The information recording/reproducing apparatus as claimed in claim 7, further comprising:
- a storing part that stores a previously set optimum recording power; and
- a correction part that corrects the previously set optimum recording power by predetermined calculation,
- wherein the corrected optimum recording power is used at the time of recording data.

13. The information recording/reproducing apparatus as claimed in claim 6, wherein the test writing is performed in at least one of the recording sectors and, after the test writing, the at least one of the recording sectors subjected to the test writing is treated as a faulty sector, and the alternative sector corresponding to the faulty sector is managed in the alternation management table.

14. The information recording/reproducing apparatus as claimed in claim 13, further comprising:
- a storing part that stores a previously set optimum recording power; and
- a correction part that corrects the previously set optimum recording power by predetermined calculation,
- wherein the corrected optimum recording power is used at the time of recording data.

15. The information recording/reproducing apparatus as claimed in claim 6,
- wherein a plurality of zones are concentrically formed in the program area in a radial direction thereof, and corresponding ones of the alternative sectors are set in each of the zones, and
- wherein the test writing is performed in the corresponding ones of the alternative sectors of at least two of the zones, thereby determining the optimum recording powers for each of the at least two zones by the optimum recording power determination part, and the determined optimum recording powers are used at the time of recording data.

16. The information recording/reproducing apparatus as claimed in claim 15, further comprising:
- a storing part that stores a previously set optimum recording power; and
- a correction part that corrects the previously set optimum recording power by predeterminated calculation,
- wherein the corrected optimum recording power is used at the time of recording data.

17. The information recording/reproducing apparatus as claimed in claim 6, further comprising:
- a storing part that stores a previously set optimum recording power; and
- a correction part that corrects the previously set optimum recording power by predetermined calculation,
- wherein the corrected optimum recording power is used at the time of recording data.

18. The information recording/reproducing apparatus as claimed in claim 6, wherein the recording sector on which test writing is performed is not a faulty sector.

19. The information recording/reproducing apparatus as claimed in claim 6, wherein the alternative sector on which test writing is performed is not set as a substitute for any of the faulty sectors.

20. The information recording/reproducing apparatus as claimed in claim 4, wherein said test writing a performed at a position or the user area at which said recording is to commence.

* * * * *